United States Patent [19]

Shimizu et al.

[11] Patent Number: 5,165,882
[45] Date of Patent: Nov. 24, 1992

[54] SEALING MECHANISM FOR SEALING AN APERTURE ON A CLOSED VESSEL

[75] Inventors: Shigemi Shimizu, Sakai; Yoshihiro Ochiai, Isesaki, both of Japan

[73] Assignee: Sanden Corporation, Gunma, Japan

[21] Appl. No.: 418,801

[22] Filed: Oct. 4, 1989

Related U.S. Application Data

[63] Continuation of Ser. No. 119,634, Nov. 12, 1987, abandoned.

[30] Foreign Application Priority Data

Nov. 11, 1986 [JP] Japan ............... 61-171911[U]

[51] Int. Cl.⁵ ............ F01C 21/00; F16B 43/00
[52] U.S. Cl. ................ 418/270; 401/136; 401/369; 401/542; 401/990
[58] Field of Search ............ 411/369, 542, 370, 544, 411/915, 150, 225, 226, 169, 973, 136, 943, 990, 963, 975-977; 418/270

[56] References Cited

U.S. PATENT DOCUMENTS

| | | | |
|---|---|---|---|
| 435,345 | 8/1890 | Cochrane | 411/150 |
| 438,687 | 10/1890 | Holliday | 411/150 X |
| 600,308 | 3/1898 | Dunlavy | 411/136 |
| 1,208,551 | 12/1916 | Hand | 411/136 |
| 1,548,076 | 8/1925 | Wallen | 411/963 X |
| 1,690,183 | 11/1928 | Stoughton | 411/369 X |
| 2,520,459 | 8/1950 | Dohm | 411/136 |
| 2,600,974 | 6/1952 | Crawford | 411/915 X |
| 2,917,819 | 12/1959 | Britton et al. | 411/915 X |
| 3,241,422 | 3/1966 | Heimovics | 411/542 X |
| 3,661,046 | 5/1972 | Waud et al. | 411/369 |
| 3,802,475 | 4/1974 | Gerlach | 411/963 X |
| 4,033,243 | 7/1977 | Kirrish et al. | 411/915 X |
| 4,737,058 | 4/1988 | Callman et al. | 411/197 X |
| 4,744,187 | 5/1988 | Tripp | 411/542 X |

FOREIGN PATENT DOCUMENTS

| | | | |
|---|---|---|---|
| 728022 | 11/1942 | Fed. Rep. of Germany | 411/150 |
| 2255839 | 6/1973 | Fed. Rep. of Germany | 411/150 |
| 691842 | 7/1965 | Italy | 411/369 |
| 6708633 | 12/1968 | Netherlands | 411/369 |
| 593688 | 10/1947 | United Kingdom | 411/150 |
| 2184187 | 6/1987 | United Kingdom | 411/542 |

Primary Examiner—Lloyd A. Gall
Attorney, Agent, or Firm—Baker & Botts

[57] ABSTRACT

A sealing mechanism for sealing an aperture formed through a housing of a closed vessel is disclosed. The sealing mechanism includes a bolt having a threaded shaft portion and a flange portion. A seating portion is formed on the outer opening of the aperture and a rotation preventing portion is formed on the surface of the seating portion. A washer is disposed on the seating portion. The washer is made of a metal softer than the material of the housing. When the bolt is rotated the washer contacts the flange portion of the bolt. The axial force of the bolt causes the washer to engage the rotation preventing portion. The rotation preventing portion deforms the washer and prevents the washer from rotating. Therefore, the inner end surface of the washer does not rub against the surface of the seating portion. As a result, adequate sealing is maintained.

10 Claims, 3 Drawing Sheets

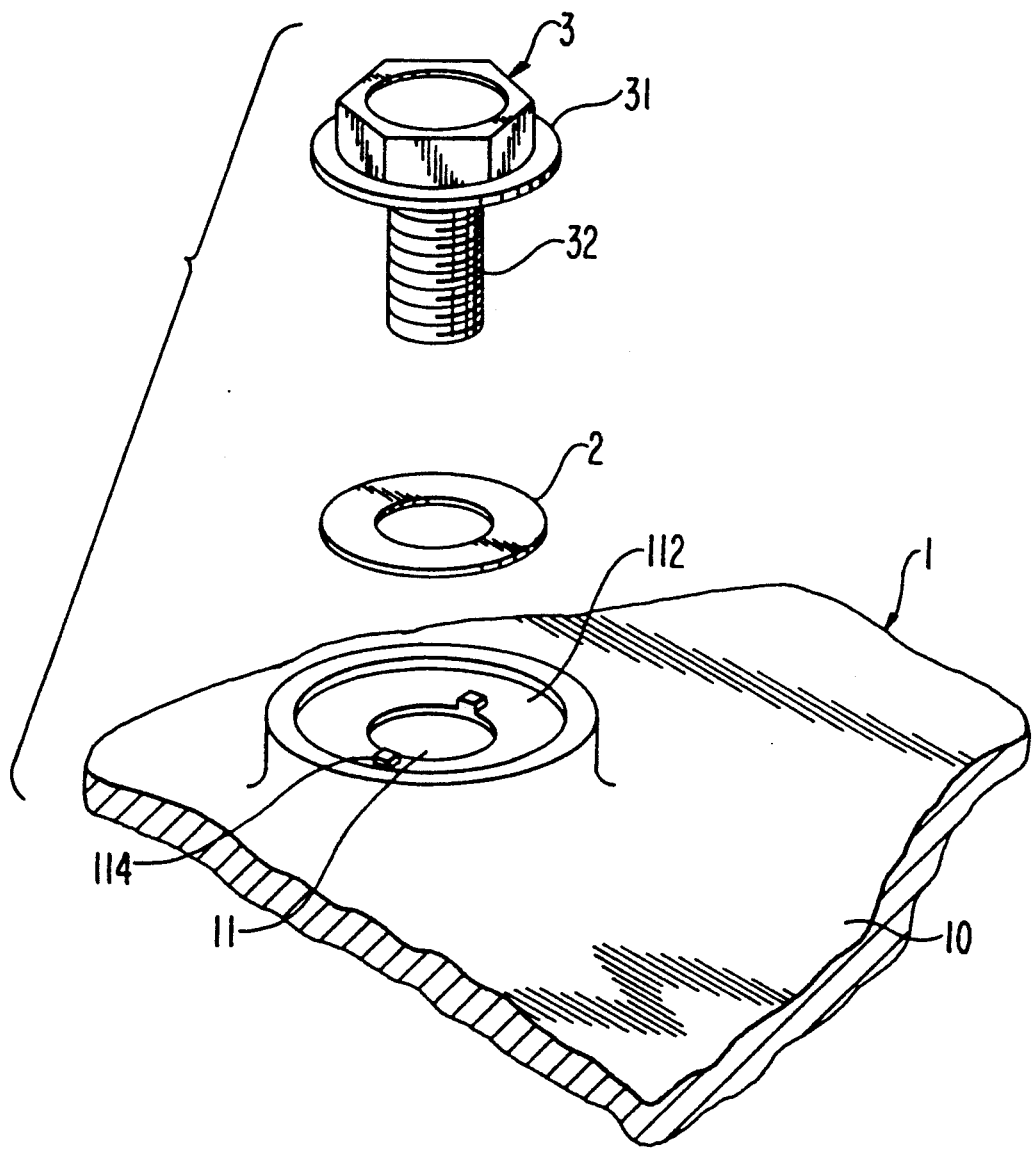

SEALING MECHANISM FOR SEALING AN APERTURE ON A CLOSED VESSEL

This application is a continuation of application Ser. No. 119,634, filed Nov. 12, 1987, now abandoned.

TECHNICAL FIELD

The present invention relates to a sealing mechanism. More particularly, the present invention relates to a sealing mechanism for sealing a securing bolt on a closed vessel, such as the compressor housing of a compressor.

BACKGROUND OF THE INVENTION

A closed vessel which contains functional parts, such as a compressor housing, must be sufficiently sealed and have a high sealing performance. However, conventional compressor housings have valved apertures, secured by a bolt or a blind plug, for enclosing refrigerant. Refrigerant passes through the valve opening before the opening is closed. However, refrigerant or oil leakage from the compressor housing through the apertures often occurs even though the apertures are closed by bolts or plugs.

Sealing mechanisms to securely seal apertures are well known. Such sealing mechanisms include washers, made of relatively soft metals such as aluminum alloy or copper, and bolts made of a relatively hard metal such as iron. However, when the bolt is screwed to the outer surface of the compressor housing, the washer rotates together with the head portion of the bolt. Therefore, the surfaces of the washer and the aperture rub against each other. These surfaces become rough and the sealing performance between these surfaces is reduced.

For example, when the opening of the aperture of a compressor housing, which is made of soft aluminum alloy, rubs against the surface of a softer copper washer during rotation of the bolt, aluminum alloy is scraped from the aperture opening by the washer and adheres to the surface of the washer. This aluminum alloy scrapes additional aluminum alloy from the opening of the aperture. This decreases the sealing performance of the compressor housing, and permits refrigerant fluid or oil to leak out. As a result, the compressor may be damaged. Furthermore, replacement of the old bolt with a new bolt to improve the seal is ineffectual because of the worn opening, and maintenance becomes difficult.

SUMMARY OF THE INVENTION

It is a primary object of this invention to provide an improved sealing mechanism for sealing an aperture formed through a closed vessel.

A sealing mechanism for sealing an aperture which is formed through a housing of a closed vessel according to the present invention includes a bolt which has a threaded shaft portion, and a threaded aperture in the vessel housing or opening. A rotation preventing portion is formed on the outer surface of the aperture. A washer, made of metal softer than the housing, is disposed on the opening. Rotation of the bolt forces the washer to contact the rotation preventing portion. During this contact, the washer is deformed and interfits with the rotation preventing portion which prevents rotation of the washer.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

BRIEF DESCRIPTION OF THE DRAWINGS

FIG. 3 is an exploded perspective view of a sealing mechanism in accordance with another embodiment of the present invention.

DETAILED DESCRIPTION OF PREFERRED EMBODIMENTS

Figure 1:
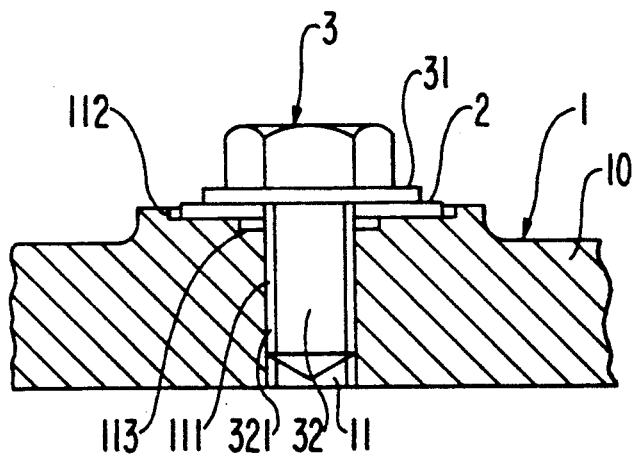
FIG. 1 is a cross-sectional view of a sealing mechanism for sealing an aperture on a closed vessel in accordance with one embodiment of the present invention.
Figure 2:
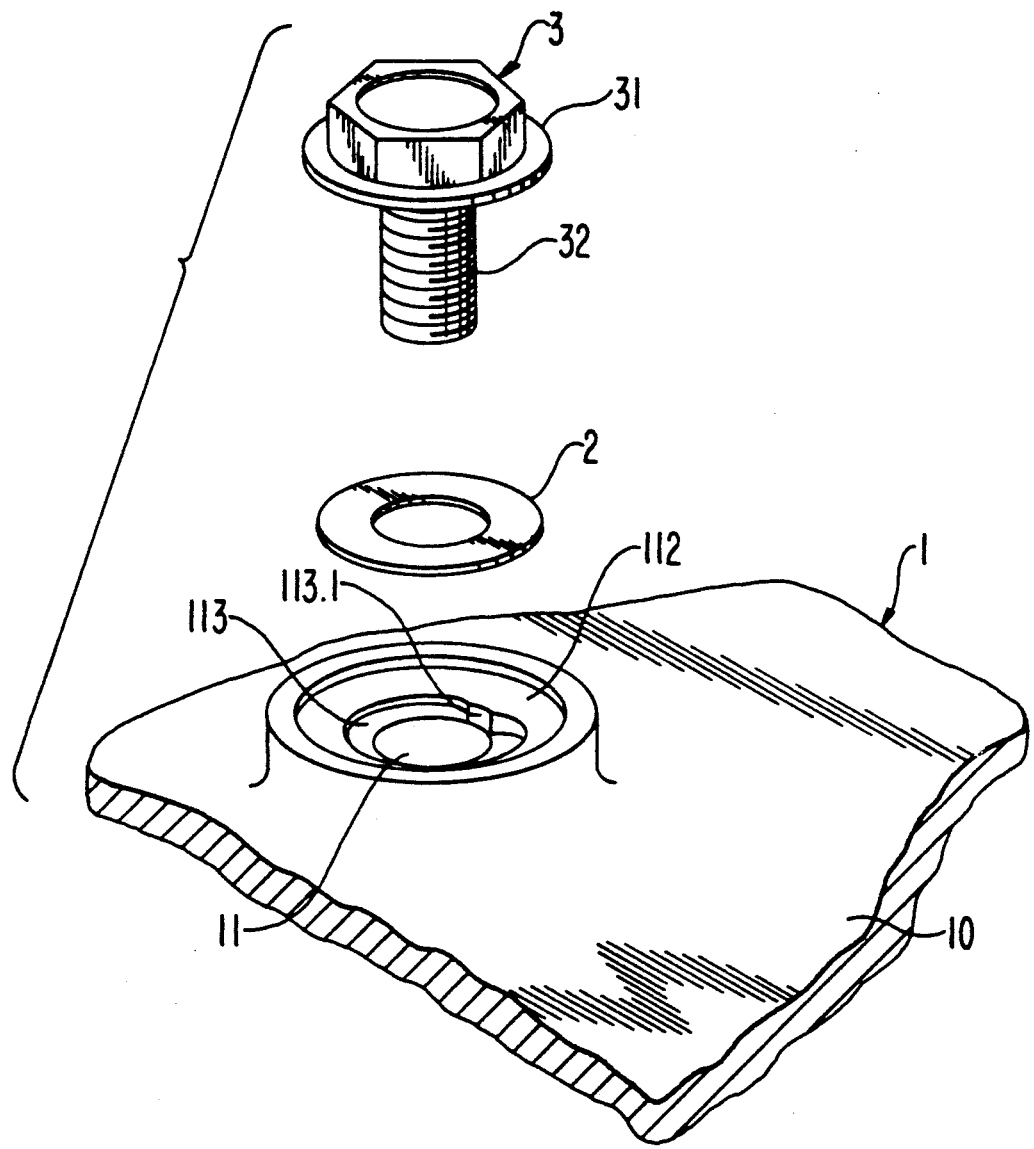
FIG. 2 is an exploded perspective view of the sealing mechanism shown in FIG. 1.

FIGS. 1 and 2 illustrate the construction of a sealing mechanism for sealing an aperture which is formed through a closed vessel according to one embodiment of this invention. Closed vessel 1 includes housing 10 through which aperture 11 is formed. Housing 10 is formed of a soft material, such as an aluminum alloy. Threaded portion 111 is formed on the inner surface of aperture 11. Countersunk seating portion or surface 112 is formed on the outer opening of aperture 11 and receives washer 2. Shelf, indent, recess or concave portion 113 is formed along the inner edge portion of seating portion 112 of aperture 11 and includes projection 113.1. Alternately, concave portion and projection 113.1 may be formed along the outer edge portion of sealing portion 112.

Washer 2 is made of a softer metallic material than housing 10, such as copper. Washer 2 has an inner diameter substantially equal to the diameter of aperture 11. Bolt 3 includes a head portion having flange portion 31, and threaded shaft portion 32 extending from one end of the head portion.

When bolt 3 is screwed into aperture 11 of housing 10, flange portion 31 presses against washer 2. At first, washer 2 rotates together with flange portion 31 of bolt. However, during rotation of bolt 3, the inner portion of washer 2 gradually deforms and interfits in concave portion 113 by the axial force of bolt 3. The washer deforms toward a shelf defined by the bottom of concave portion 113. Washer 2 deforms because it is made of copper, which is softer than housing 10 which is made of aluminum alloy. This prevents washer 2 from rotating. As a result, the inner end surface of washer 2 does not rub against the surface of housing 10. This avoids wear of the surface of housing 10. The deformation of washer 2 occurs only at its inner surface to maintain the sealing between washer 2 and housing 10. Washer 2 is also prevented from rotating when bolt 3 is unfastened. This preserves the efficiency of the seal.

When convex portions or projections are used instead of concave portions 113, as shown in FIG. 3, the principles and operation of the device are the same. The difference is in the deformations in washer 2. In the embodiment of FIGS. 1 and 2, washer 2 deforms to fit within concave portion 113 of seating portion 112. In the embodiment of FIG. 3, washer 2 deforms to permit convex portions 114 of seating portion 112 to fit therein.

Numerous characteristics, advantages and embodiments of the invention have been described in detail in the foregoing description with reference to the accompanying drawings. However, the disclosure is illustrative only and the invention is not limited to the precise illustrated embodiments. Various changes and modifications may be effected therein by one skilled in the art without departing from the scope or spirit of the invention.

We claim:

1. A vessel having a wall including an aperture formed therethrough and a sealing mechanism for sealing the aperture, said sealing mechanism comprising:
   a bolt having a shaft and a flange;
   a washer being formed of a softer material than the vessel wall;
   a seating portion countersunk in said vessel wall and being integrally formed therewith for seating said washer therein, said seating portion surrounding said aperture; and
   a shelf adjacent said seating portion and countersunk therein, said shelf being formed integrally with said seating portion and concentrically disposed about said aperture, such that said washer deforms towards said shelf as said bolt is tightened to prevent relative movement between said washer and said seating portion.

2. A vessel according to claim 1 wherein the vessel is a compressor.

3. A vesel according to claim 1 wherein said seating portion includes a seating surface having a planar portion substantially concentrically disposed about said aperture.

4. A vessel according to claim 3 wherein said seating portion further includes a projection extending radially inwardly from said seating surface along said shelf toward said aperture.

5. A vessel according to claim 1 wherein said shaft of said bolt is threaded for threadably engaging threads formed on the portion of the wall which immediately surrounds said aperture.

6. A vessel according to claim 1 wherein said wall is aluminum alloy and said washer is copper.

7. A compressor housing having a wall including an inner surface, an outer surface, an aperture formed therethrough and a sealing mechanism formed therein and about said aperture, said sealing mechanism comprising:
   a bolt having a shaft and a flange;
   a washer;
   a seating portion countersunk in said compressor housing wall and being integrally formed therein for seating said washer, said seating portion surrounding said aperture; and
   at least one projection integrally formed on said seating portion, such that said washer deforms over said at least one projection as said bolt is tightened to prevent relative movement between said washer and said seating portion, wherein said seating portion includes a seating surface having a planar portion substantially concentrically disposed about said aperture, and said seating portion further includes a projection extending radially inward from said seating surface toward said aperture.

8. A compressor housing having a wall including an inner surface, an outer surface, an aperture formed therethrough and a sealing mechanism formed therein and about said aperture, said sealing mechanism comprising:
   a bolt having a shaft and a flange;
   a washer;
   a seating portion countersunk in said compressor housing wall and being integrally formed therein for seating said washer, said seating portion surrounding said aperture; and
   a shelf adjacent said seating portion and countersunk therein, said shelf formed integrally with said seating portion and being concentrically disposed about said aperture, such that said washer deforms towards said shelf as said bolt is tightened to prevent relative movement between said washer and said seating portion.

9. A compressor housing according to claim 8 wherein said seating portion includes a seating surface having a planar portion substantially concentrically disposed about said aperture.

10. A compressor housing according to claim 9 wherein said seating portion further includes a projection extending radially inwardly from said seating surface along said shelf toward said aperture.

* * * * *